(12) United States Patent
Manolov et al.

(10) Patent No.: US 8,918,367 B2
(45) Date of Patent: Dec. 23, 2014

(54) TWO PHASE COMMIT EMULATION FOR NON DISTRIBUTED TRANSACTIONS

(75) Inventors: Svetoslav Manolov, Sofia (BG); Ivo Simeonov, Sofia (BG)

(73) Assignee: SAP SE, Walldorf (DE)

(*) Notice: Subject to any disclaimer, the term of this patent is extended or adjusted under 35 U.S.C. 154(b) by 1822 days.

(21) Appl. No.: 10/837,001

(22) Filed: Apr. 30, 2004

(65) Prior Publication Data
US 2007/0118565 A1    May 24, 2007

(51) Int. Cl.
*G06F 7/00* (2006.01)
*G06F 17/30* (2006.01)

(52) U.S. Cl.
CPC ............. *G06F 17/30371* (2013.01)
USPC ...................................... 707/661

(58) Field of Classification Search
CPC ............. G06F 17/30067; G06F 17/30008; G06F 11/1464; G06F 11/1469; G06F 17/30286
USPC .......... 707/200, 8–9, 102, 661; 395/600, 610; 709/204; 718/100; 719/315, 328
See application file for complete search history.

(56) References Cited

U.S. PATENT DOCUMENTS

| | | | |
|---|---|---|---|
| 4,868,744 A * | 9/1989 | Reinsch et al. ............. 714/19 |
| 5,261,089 A * | 11/1993 | Coleman et al. ............. 707/8 |
| 5,452,445 A * | 9/1995 | Hallmark et al. ............ 707/2 |
| 5,680,610 A * | 10/1997 | Smith et al. ............... 707/10 |
| 5,701,480 A * | 12/1997 | Raz ....................... 718/101 |
| 5,764,897 A * | 6/1998 | Khalidi .................... 709/201 |
| 5,832,516 A * | 11/1998 | Bamford et al. ............ 707/202 |
| 5,835,766 A * | 11/1998 | Iba et al. .................. 718/104 |
| 6,061,708 A * | 5/2000 | McKeehan et al. .......... 718/101 |
| 6,480,847 B1 * | 11/2002 | Linenbach et al. ............ 707/8 |
| 6,490,575 B1 * | 12/2002 | Berstis ...................... 707/3 |
| 6,556,995 B1 * | 4/2003 | Child et al. .................. 707/9 |
| 6,567,809 B2 * | 5/2003 | Santosuosso ............... 707/10 |
| 6,738,971 B2 * | 5/2004 | Chandrasekaran et al. .. 718/100 |
| 6,801,919 B2 * | 10/2004 | Hunt et al. ................. 707/202 |
| 6,832,238 B1 * | 12/2004 | Sharma et al. ............. 709/201 |
| 7,076,784 B1 * | 7/2006 | Russell et al. ............. 719/315 |
| 7,089,566 B1 * | 8/2006 | Johnson ................... 719/328 |
| 7,290,056 B1 * | 10/2007 | McLaughlin, Jr. .......... 709/230 |
| 7,506,342 B2 * | 3/2009 | Mousseau et al. .......... 719/320 |
| 2002/0161815 A1 * | 10/2002 | Bischof et al. ............. 709/101 |
| 2003/0046298 A1 * | 3/2003 | Weedon ................... 707/102 |
| 2003/0046342 A1 * | 3/2003 | Felt et al. .................. 709/203 |
| 2003/0115429 A1 * | 6/2003 | Olstad et al. ............... 711/158 |
| 2003/0204534 A1 * | 10/2003 | Hopeman et al. .......... 707/200 |
| 2004/0015851 A1 * | 1/2004 | Newhook et al. .......... 717/116 |
| 2004/0070678 A1 * | 4/2004 | Toyama et al. .......... 348/231.3 |
| 2004/0078495 A1 * | 4/2004 | Mousseau et al. ............ 710/1 |

(Continued)

OTHER PUBLICATIONS

Global transaction support with two-phase commit, IBM Corporation 2000, www//publib.boulder.ibm.com/radhelp/.*

(Continued)

*Primary Examiner* — Ajay Bhatia
*Assistant Examiner* — Jessica N Le (57) ABSTRACT

A method is described that comprises executing a non distributed transaction by reading persistent data from a database and performing executions with the persistent data. A prepare command is sent to the database after a change to be made to the persistent data as a consequence of the non distributed transaction's execution is confirmed. A commit command is sent to the database to cause the database to commit the change to the database.

33 Claims, 6 Drawing Sheets

(56) References Cited

U.S. PATENT DOCUMENTS

| | | | |
|---|---|---|---|
| 2004/0148289 A1* | 7/2004 | Bamford et al. | 707/10 |
| 2004/0205066 A1* | 10/2004 | Bhattacharjee et al. | 707/8 |
| 2004/0216107 A1* | 10/2004 | Somogyi et al. | 718/100 |
| 2005/0203961 A1* | 9/2005 | Mehra et al. | 707/200 |
| 2006/0167999 A1* | 7/2006 | Clark et al. | 709/204 |

OTHER PUBLICATIONS

Database Two Phase Commit, Carnegie Mellon Software Engineering Institute, Jun. 20, 1997, www.sei.cmu.edu/str/descriptions/dtpc_body.html.*

Managing JDBC Connectivity, BEA System, Inc. 2001, www.e-docs.bea.com.*

* cited by examiner

TWO PHASE COMMIT EMULATION FOR NON DISTRIBUTED TRANSACTIONS

FIELD OF INVENTION

The field of invention relates to computing generally; and, more specifically, to two phase commit emulation for non distributed transactions.

BACKGROUND

The information systems of a modern day enterprise (such as a corporation or government institution) are often responsible for managing and performing automated tasks upon large amounts of data. Persistent data is that data that "exists" for extended periods of time (i.e., "it persists"). Persistent data is typically stored in a database so that it can be accessed as needed over the course of its existence. Here, complex "database software" (e.g., such as DB2, Oracle, and SQL Server) is often used to actually read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction".

A distributed transaction is a transaction that involves more than one database or server. Distributed transactions frequently involve multiple databases accessed through multiple servers that are interconnected by a network. Because of the use of multiple databases, distributed transactions are an attempt at some sort of comprehensive function that serves the enterprise's needs. For example, in the case of an airline, a single distributed transaction might be used to manage an internet connection to a potential customer who may reserve a particular seat on a particular flight. Here, note that a number of different databases may be involved in a single distributed transaction that is executed for the customer's experience with the airline's on-line ticketing and reservation system.

For example, assume the distributed transaction is expected to: 1) provide the potential customer with flight scheduling, pricing and seating information; 2) record the customer's name, address, credit card, and email information if any flight is reserved by the customer; 3) update the seating information for each seat reserved by the customer; 4) update the customer's frequent flier mileage records if the customer is registered in the airline's frequent flier program; 5) update the airline's accounting records to reflect the new revenue introduced by each flight reservation made by the customer; and, 6) invoice the customer using the customer's credit card information.

Here, a number of different databases may be involved in the distributed transaction such as: 1) a first database that keeps track of the airline's flight scheduling information; 2) a second database that keeps track of information specific to a particular flight such as seating information; 3) a third database that keeps track of flight pricing information; 4) a fourth flight that keeps track of each customer's name, address and email information; 5) a fifth database that keeps track of each frequent flier's mileage; 6) a sixth database that keeps track of the airline's accounting records; and 7) a seventh database that keeps track of the airline's invoicing records.

Figure 1A:
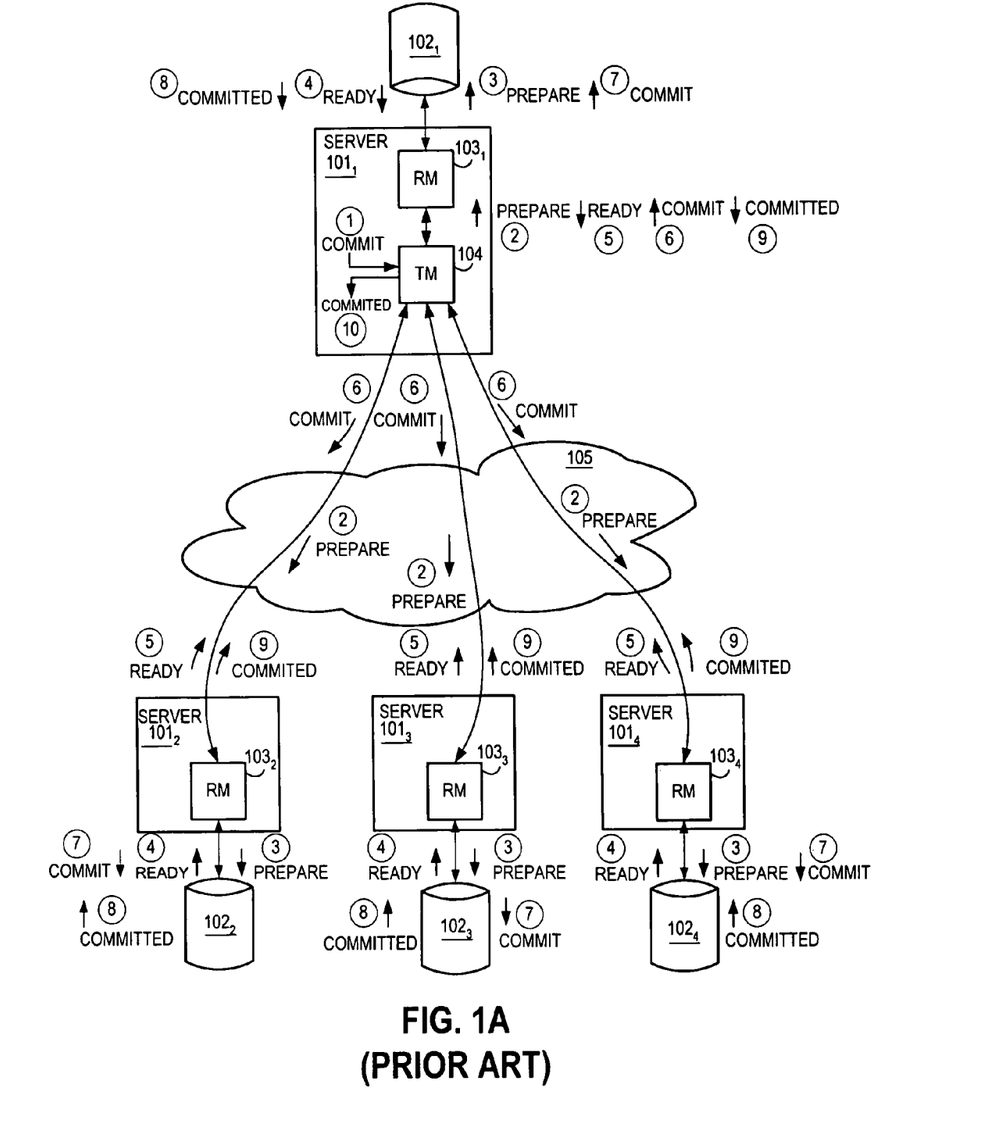
FIG. 1a (prior art) shows a two phase commit protocol distributed transaction that concludes with all updates being made to their respective databases.
Figure 1B:
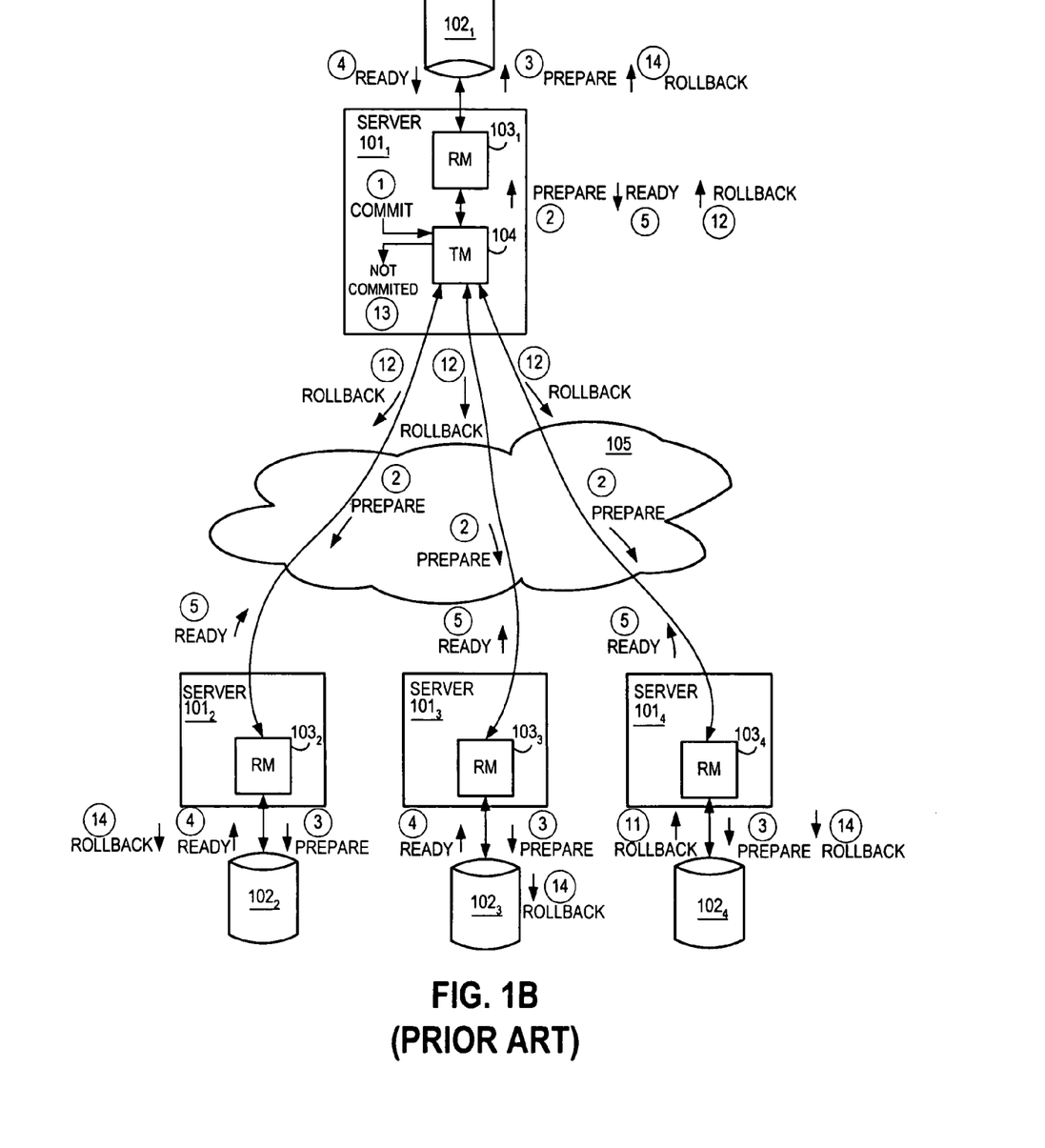
FIG. 1b (prior art) shows a two phase commit protocol distributed transaction that concludes with no updates being made to any databases.

FIGS. 1a and 1b depict how a distributed transaction is typically carried out by an enterprise's information system infrastructure. A protocol, referred to as the "two-phase commit" protocol is used to ensure that either a distributed transaction's database updates are successfully completed in their entirety; or, the distributed transaction is not effected at all. By ensuring that database updates for a distributed transaction are either completely carried out or not carried out at all, incorrect database records are avoided (e.g., a seat being reserved for a reservation that is not actually made, a seat not being reserved for a reservation that is actually made, etc.). FIG. 1a corresponds to a two-phase commit protocol in which all of distributed transaction's database updates are recorded. FIG. 1b corresponds to a two-phase commit protocol in which none of distributed transaction's database updates are recorded.

The example of FIG. 1a shows four servers $101_1$ through $101_4$, each coupled to its own corresponding database $102_1$ through $102_4$; where, each of the databases is to be updated with new information upon completion of the distributed transaction's various calculations. That is, first a distributed transaction performs its various tasks and calculations with the data that it uses; then, upon completion of these tasks and calculations, the distributed transaction's databases are updated with any updates needed to be made to their respective data as a consequence of the distributed transaction's full execution.

Each server $101_1$ through $101_4$ includes its own resource manager module $103_1$ through $103_4$ that is responsible for communicating with a particular database. The resource manager can often be viewed as driver software that is used to send specific functional commands to the database software in response to requests/commands made by higher level software functions. The commands sent to a database are typically scripted in some form of database language (e.g., Structured Query Language (SQL)). Examples of resource managers include a Java Database Connectivity (JDBC) driver that is presently part of the J2EE platform and an Open Database Connectivity (ODBC) driver provided by Microsoft Corporation.

A transaction manager module 104 is responsible for, typically among other responsibilities, implementing the two-phase commit protocol with those resource managers that communicate to a database that is to be updated after a distributed transaction's calculations have been executed. In the examples of FIGS. 1a and 1b, each of databases $102_1$ through $102_4$ are assumed to require some portion of their data to be changed as a consequence of the distributed transaction's completed execution. The transaction manger 104 therefore coordinates a sequence of messaging exchanges between itself and resource managers $103_1$ through $103_4$. Examples of transaction manager modules include the API and logic behind the Java Transaction API (JTA) that is part of the J2EE platform and the Microsoft Distributed Transaction Coordinator (MDTC) from Microsoft Corporation. A high level exemplary review of the messaging used to implement a two phase commit protocol immediately follows.

Once a distributed transaction's calculations are completed so that all database changes to be made as a consequence of the transaction's execution are known (e.g., entry of a specific reserved seat on a specific flight, etc.), the first phase of the two-phase commit protocol begins with the transaction manager 104 receiving a "commit" command 1 from another portion of the distributed transaction's software (e.g., "a client" or "container" that executes higher level functions of the distributed transaction). In response to the received "commit" command 1, the transaction manager 104 sends "prepare" commands 2 to each of the resource managers $103_1$ through $103_4$. Note that, because a network 105 resides between the server $101_1$ that contains the transaction manager 104 and servers $101_2$ through $101_4$, those of the "prepare" commands 2 that are sent to servers $101_2$ through $101_4$ pass through network 105.

In response to the received "prepare" commands 2, each resource manager forwards a "prepare" command 3 to its corresponding database in the appropriate language format (e.g., SQL). Each database $102_1$ through $102_4$ performs what is akin to a "soft write" of the new, updated information. That is, for example, each database runs through all internal routines just short of actually writing the new, updated information. If a problem is not detected by a database (e.g., an incompatibility in the data) just short of the actual write of the updated information, a database reports a "ready" response. In FIG. 1a, each database reports a "ready" response 4; and, in FIG. 1b, databases $102_1$ through $102_3$ report a "ready" response while database $102_4$ reports a "rollback" response 11.

A "rollback" response means that a database has recognized some problem in preparing itself to actually write its updated information. As a consequence, a "rollback" response essentially means that the new information cannot be written. Given that all new information of distributed transaction must be written or no new information from a distributed transaction may be written, as shall become evident in more detail immediately below, the "ready" response of each server in FIG. 1a results in all of the new information being written to each server; while, the single "rollback" response 11 in FIG. 1b results in no new information being written to any server. The situation of FIG. 1a therefore corresponds to a situation in which the distributed transaction "takes effect"; while, the situation in FIG. 1b corresponds to the distributed transaction as not being recognized as ever having being executed.

In FIGS. 1a and 1b, the responses of each of the databases $102_1$ through $102_4$ (e.g., "ready" responses 5 in FIG. 1a) are forwarded to the transaction manager by the resource managers $103_1$ through $103_4$. The reception of these responses by the transaction manager 104 marks the end of the first phase of the two-phase commit protocol.

The transaction manager's sending of a second set of messages in response to the received responses marks the beginning of the second phase. Because the transaction manager 104 receives all "ready" responses from the resource managers $103_1$ through $103_4$ in the situation of FIG. 1a, the transaction manager responds with the sending of a set of "commit" messages 6 to the resource managers $103_1$ through $103_4$. The resource managers $103_1$ through $103_4$ forward 7 the "commit" command to their respective databases $102_1$ through $102_4$ which, in turn, causes the prepared data to be actually written into each. The databases confirm that the data updates have been successfully written by sending a "committed" response 8 to their corresponding resource managers. The resource managers then forward 9 these messages to the transaction manager 104. The transaction manager 104 then responds to the original commit command 1 with a committed response 10. At this point all databases to be updated with new information are updated and the second phase of the two-phase commit protocol is complete.

In FIG. 1b, the reception of the rollback message from server $101_4$ by the transaction manager 104 causes the transaction manager 104 to send rollback messages 12 to each of the resource managers $103_1$ through $103_4$ and to inform the higher level software that the new data could not be committed 13. These rollback messages 11 are then effectively forwarded 14 to the databases $102_1$ through $102_4$; which, in turn, causes each of servers $102_1$ through $102_3$ to cancel their prepared writes of new information. As such, no new information is written into any of the databases $102_1$ through $102_4$.

SUMMARY

The present invention is illustrated by way of example and not limitation in the figures of the accompanying drawings, in which like references indicate similar elements and in which:

A method is described that comprises executing a non distributed transaction by reading persistent data from a database and performing executions with the persistent data. A prepare command is sent to the database after a change to be made to the persistent data as a consequence of the non distributed transaction's execution is confirmed. A commit command is sent to the database to cause the database to commit the change to the database.

FIGURES

The present invention is illustrated by way of example and not limitation in the figures of the accompanying drawings, in which like references indicate similar elements and in which.

DETAILED DESCRIPTION

An issue is the effect of accesses made to an item of persistent data by a non distributed transaction. A local transaction, which involves access to only a single database and/or uses a single server, is a common form of non distributed transaction. Traditionally, the two phase commit protocol is not applied to a non distributed transaction because their does not exist a risk that a first database will be updated with new information from the transaction while a second database will fail to be updated with new information from the transaction. Thus, the traditional approach is to access a database with a two phase commit protocol for distributed transactions but not for non distributed transactions. For non distributed transactions, commands having the effect of a direct "read" or "write" are issued by a resource manager to its corresponding database.

Using a two phase commit protocol for distributed transactions but not for non distributed transactions causes a database to be treated "differently" as between distributed and non distributed transactions. That is, for distributed transactions a database will receive prepare and commit commands while for non distributed transactions a database will not receive a prepare command. It should be understood that a specific item of persistent data may be targeted by both distributed and non distributed transactions alike over the course of its existence.

Various persistent data management inefficiencies may result as a consequence of different access schemes being used for the different types of transactions. Persistent data management typically involves the question of how to handle a situation where at least two different transactions desire control and/or use of a same item of data (sometimes at approximately the same time). For example, if an airline enterprise maintains a database record for a particular flight, multiple customers may be simultaneously attempting to reserve the same seat on the same flight. For distributed transactions, the structure of the two phase commit protocol is often used to support the designed for treatment of competing needs to control and/or use persistent data.

For example, to name just one possibility, a "prepare" command issued for the write of a specific item of persistent data during a distributed transaction could be used to trigger some awareness or alertness to another application (e.g., because the other application is sensitive to changes to the data item). Because non distributed transactions do not invoke the use of a prepare command, no such awareness can be designed for a non distributed write command unless additional functionality is designed to account for awareness without a prepare command being issued. Other issues may arise simply because distributed transactions receive a two-phase commit protocol while non distributed transactions do not.

A solution then is to emulate a two-phase commit protocol for writes made to a database as part of a non distributed transaction. So doing causes a non distributed transaction to be designed, like a distributed transaction, to perform its database read(s) and perform whatever executions/calculations it performs prior to updates that reflect changes in the database's data being written back to the database.

Figure 2:
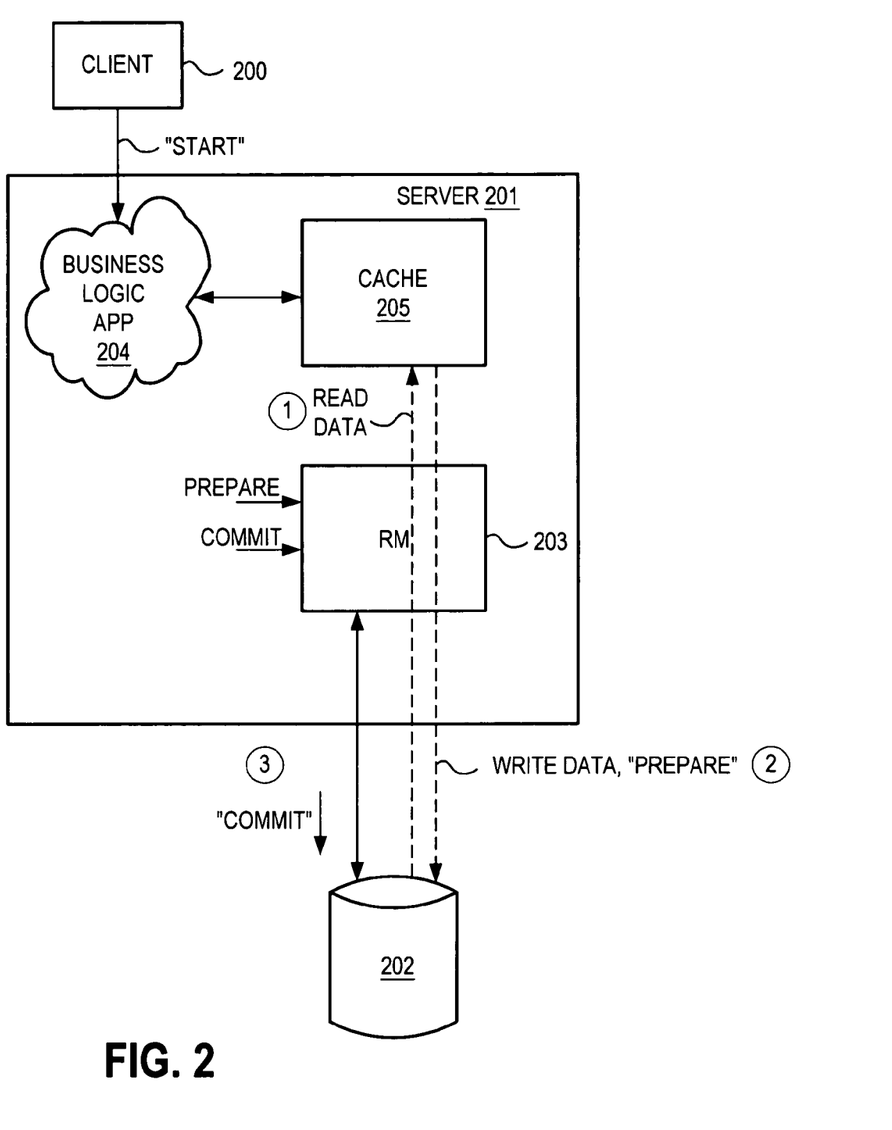
FIG. 2 shows a technique by which elements of a two phase commit protocol are utilized to access database information in a non distributed transaction context.

FIG. 2 illustrates an example of a non distributed transaction being designed to operate as described just above. According to the example of FIG. 2, a client 200 triggers the execution of a non distributed transaction that is executed by a block of application software 204 that is installed on a server 201 (noting that in the particular example of FIG. 2 the application software corresponds to business logic). The server 201 may be Java 2 Enterprise Edition ("J2EE") server node which supports Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Note that the non distributed transaction of FIG. 2 can be viewed as a local transaction because it involves a single database 202 and server 201. The database data that is used by the application software 204 is read 1 from the database 202 and performed upon and/or with by the application software 204. The database data is read 1 into a cache 205 by the resource manager 203 to enhance the speed at which the application's functions can be performed.

When the application software 204 associated with the non distributed transaction is complete so as to define any changes that need to be made to the database's data (e.g., an update of new information to information that was read 1 from database 202, the addition of new data, etc.), a prepare command is issued to the database 202. The resource manager 203 associates with the prepare command, in a format that is recognizable to the database 202, the write data that corresponds to the change(s) to be made to the database's data. The write data may originate from the cache 205. According to one embodiment, the prepare command 2 that is sent to the database 202 by the resource manager 203 is in response to the resource manager itself receiving a prepare command (or a command that is interpreted by the resource manager 203 to send a prepare command to the database 202).

In one embodiment, a "commit" command is sent 3 to the database by the resource manager 203 before a "ready" response that is sent by the database 202 is received by the database 202. Here, recall that the two-phase commit protocol has been traditionally used to ensure that a distributed transaction can never update a first database and fail to update a second database. But in the case of a single database non distributed transaction (as is the case in the example of FIG. 2), there is no risk of another database not being updated. Therefore a "ready" command need not be collected (because at most there would only be one "ready" command to be received).

The "commit" command 3 can therefore be issued to the database prior to reception of a "ready" command. If the database 202 happens to issue a "rollback" response to the "prepare" command 2 that it received, the database 202 can be designed to ignore the premature "commit" command 3 that was sent by the server 201 to the database 202. The sending of the "prepare" and "commit" commands 2, 3 to the database 202 even though the transaction is not a distributed transaction makes the distinction between distributed and non distributed transactions transparent to the database 202. Therefore, persistent data management schemes (such as those that trigger awareness of a potential data change on a prepare command) can be applied to database updates where no understanding of transaction type is necessary.

Simulating a two-phase commit protocol for a non distributed transaction as described above corresponds to updating "together" all of the changes to be made to the database's persistent data as a consequence of the application's complete execution being performed. That is, changes to the database's persistent data are not strung-out over the time period of the application's execution; but rather, are made during execution of the coordinated two-phase commit protocol emulation after completion of the application or at least until after all changes to made to the database's persistent data as consequence of the application's complete execution have been confirmed.

Thus, for example, if a change is to be made to a specific item of persistent data (e.g., a database data entry such as a row of data in a database table) early on in the time span of the application's execution, the change is not immediately made in the database but rather is delayed until execution of the simulated two-phase commit protocol after the application's execution is complete. Delaying all persistent data changes resulting from the application's complete execution in this manner causes the database's persistent data to be updated only once as a consequence of the application's complete execution. This, in turn, corresponds to the application making reduced demand upon the database. Reducing the demand upon the database in this manner should result in improved database performance/efficiency.

According to one embodiment, the commit command 3 that is sent to the database 202 by the resource manager 203 is in response to the resource manager itself receiving a commit command (or a command that is interpreted by the resource manager 203 to send a commit command to the database 202). Also, as already described above, the prepare command 2 that is sent to the database 202 by the resource manager 203 is in response to the resource manager itself receiving a prepare command (or a command that is interpreted by the resource manager 203 to send a prepare command to the database 202).

Figure 3:
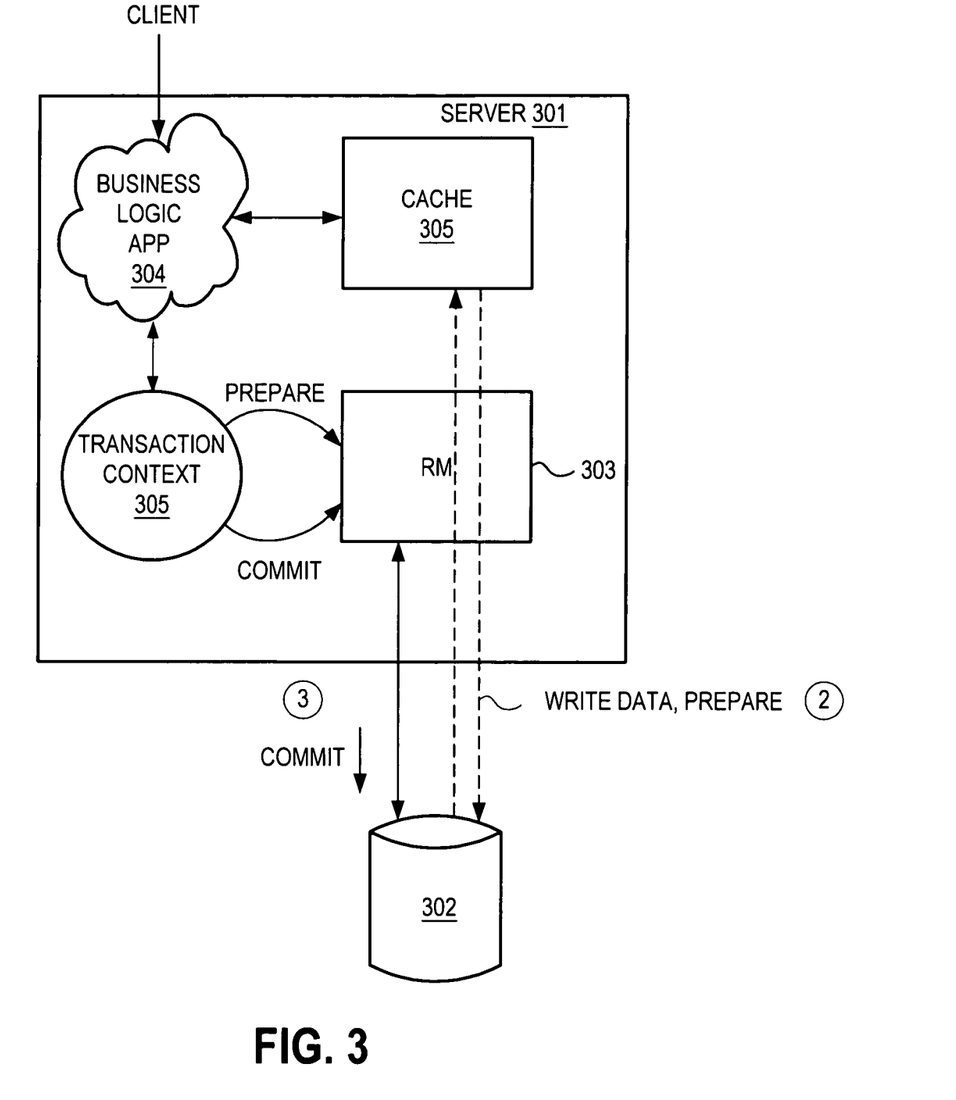
FIG. 3 demonstrates an embodiment where a transaction context object may be used to assist in a technique by which elements of a two phase commit protocol are utilized to access database information in a non distributed transaction context.

FIG. 3 elaborates on an embodiment that addresses in more detail how prepare and commit commands may be issued to the resource manager 303 within the server 301. According to the approach of FIG. 3, a module of software 305 that is used to keep track of a transaction's context is used to: 1) recognize that a transaction is not a distributed transaction; and/or, 2) issue prepare 2 and commit commands 3 to the resource manager 303 once a non distributed transaction (such as application 304) has completed its calculations upon persistent data. A transaction's context is normally used to "keep track of" the transaction itself and typically includes an identity of the transaction, the present state of the transaction as well as other attributes.

In an object oriented environment, the module 305 of transaction context software may be implemented as a transaction context object. In a further embodiment, the transaction context object includes a data field that indicates whether or not the transaction is a distributed transaction (e.g., a "globalcontext" parameter that, if a null value or non existent, indicates that the transaction is a non distributed transaction; or, if not a null value or is in existence, indicates that the transaction is a distributed transaction).

Depending on perspective and/or design, a non distributed transaction may not be recognized into the conscience of the server 301. For example, according to one perspective, the only recognized "transaction" is what has heretofore been referred to as a "distributed transaction" and what has heretofore been referred to as a "non distributed transaction" is viewed as an isolated thread (where a thread is a single flow of executions). In an embodiment where such a perspective is maintained, a transaction context (and/or transaction context object) exists only if the transaction is what has been heretofore referred to as a "distributed transaction". If so, a further embodiment entails creating a transaction context even though it references a thread. In other approaches, a transaction context may naturally exist for non distributed transactions (e.g., with a special identifier that registers it as a "null" or "unspecified") so a specially created context is not necessary.

Irregardless of perspective, a transaction context may be used to identify those database items that need to be written into the database to update or add persistent data as a consequence of the non distributed transaction's execution. As such, the transaction context is used in conjunction with the resource manager 303 to send the write data to the database in view of a corresponding prepare command. In an object oriented environment, the transaction context object 305 would identify specific objects that need to be written into the database.

The transaction context module 305 may also issue prepare and commit commands to the resource manager 303 (or commands that are interpreted by the resource manager 303 to cause the resource manager 303 to send prepare and commit commands 2, 3 to the database 302) in light of the state of the non distributed transaction. For example, in an object oriented environment, a transaction context object for the non distributed transaction may be retrofitted with one or methods that recognize the completion of its corresponding non distributed transaction's tasks; and, in response to this recognition, forward to the resource manager 303 a prepare command or other message that causes the resource manager 303 to send a prepare command to the database.

Likewise, the transaction context object 305 may be similarly retrofitted with one or more methods that send the resource manager a commit command (or a command that causes the resource manager 303 to send a commit command to the database 302). The timing of when a commit is sent to the resource manager may be without regard to the reception of a "ready" command from the database 302 (as discussed at length above with respect to FIG. 2); or, may be in response to the reception of a "ready" command (so that a true two phase protocol is executed with the database).

Note that, in a sense, a transaction context module 305 (such as a transaction context object) that assumes control of the sending of prepare and commit messages as described just above, in a sense, acts as a transaction manager for a non distributed transaction. Recall that the role of a transaction manager for distributed transactions has already been described in the background of the present application. Accordingly, it may be an alternative approach to retrofit a transaction manager with the ability to control the issuance of prepare and commit messages at the end of a non distributed transaction. For example, certain software platforms come with an extensive suite of services/modules (such as a Enterprise Java Beans contained having both transaction manager services (JTA) and resource manager services (JDBC)). The transaction manager service/module of such a suite may be designed to cause prepare and commit messages for non distributed transactions. Alternatively, again if the perspective is enforced that only distributed transactions are recognized transactions, some other entity (such as transaction context object in an object oriented environment as described above) may be used.

Figure 4:
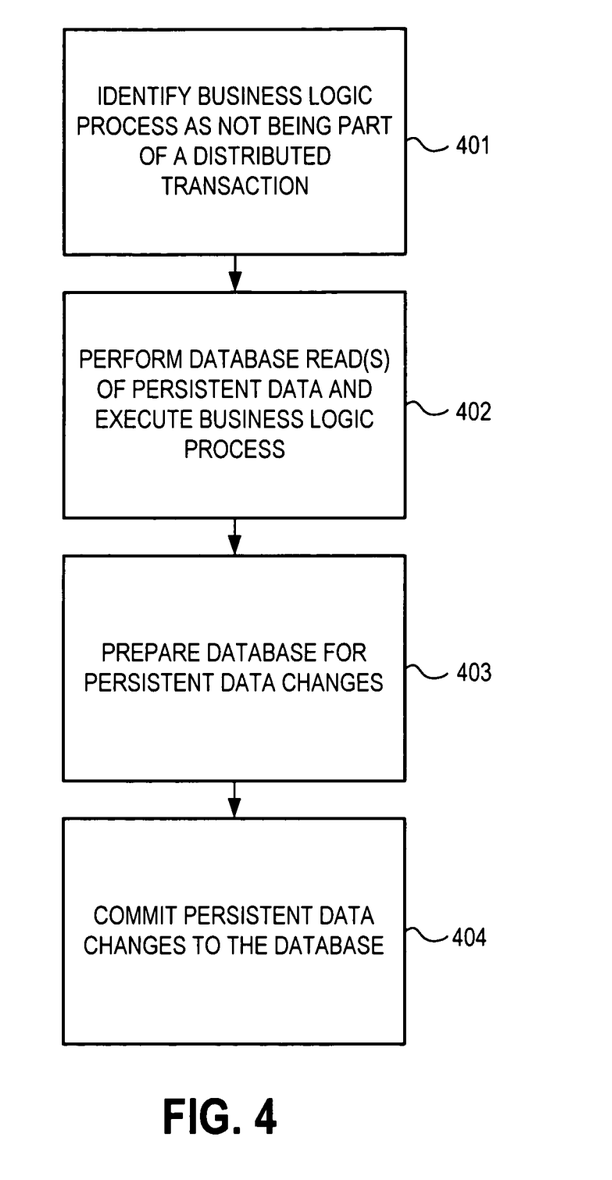
FIG. 4 shows a methodology for using elements of a two-phase commit protocol to access database information in a non distributed transaction context.

FIG. 4 shows a methodology in flow chart form that teaches a method of executing a non distributed transaction consistent with the teachings provided above. First, a business logic process to be executed is identified as not belonging to a distributed transaction 401. Persistent data used by the business logic process is read by the business logic process and the business logic process is executed 402. Upon completion of the business logic process (so that all changes made to the persistent data as a consequence of the business logic process's full execution are known), the database is prepared 403 for the changes by sending a prepare command to the database (noting that the changes themselves are to be passed to the database at some point). The changes made to the persistent data may take the form of updates to information that was previously read 402 and/or the addition of new items of persistent data that need to be added to the database. The changes are then committed 404 to the database through the sending of a commit command to the database to which the database responds by physically writing the persistent data changes to the database's persistent data. The database may be a relational database.

Processes taught by the discussion above may be performed with program code such as machine-executable instructions which cause a machine (such as a general-purpose processor or special-purpose processor) to perform certain functions. Alternatively, these functions may be performed by specific hardware components that contain hardwired logic for performing the functions, or by any combination of programmed computer components and custom hardware components.

Program code may be stored by a machine-readable medium. The machine-readable medium may include, but is not limited to one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 5:
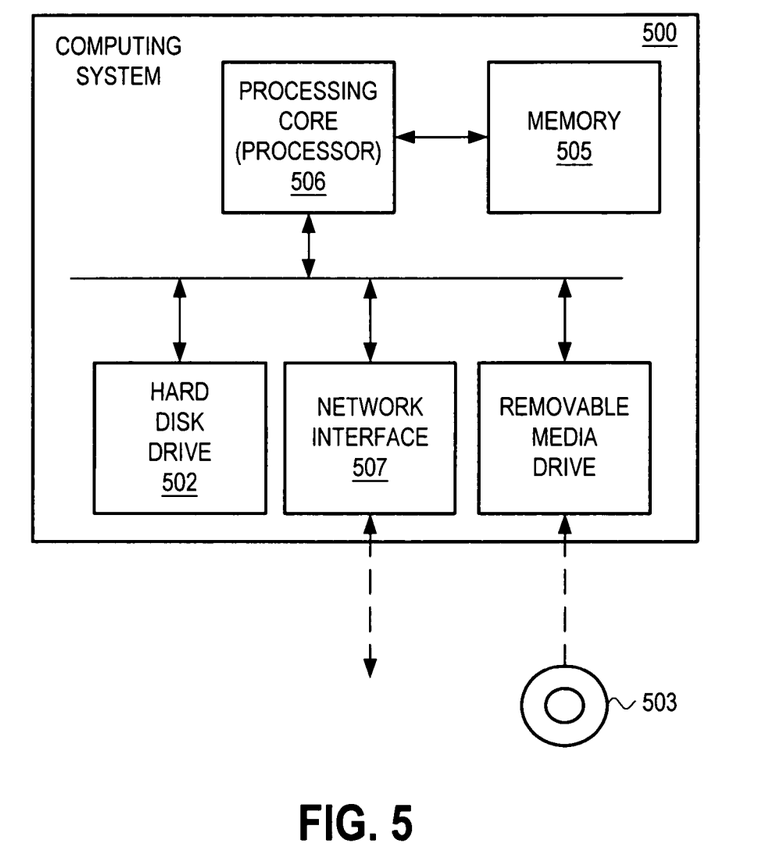
FIG. 5 shows an embodiment of a computing system.

FIG. 5 is a block diagram of a computing system 500 that can execute program code stored by an article of manufacture. It is important to recognize that the computing system block diagram of FIG. 5 is just one of various computing system architectures. The applicable article of manufacture may include one or more fixed components (such as a hard disk drive 502 or memory 505) and/or various movable components such as a CD ROM 503, a compact disc, a magnetic tape, etc. In order to execute the program code, typically instructions of the program code are loaded into the Random Access Memory (RAM) 505; and, the processing core 506 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer implemented method for executing a non distributed transaction that involves a single database storage unit, comprising:
   detecting that a transaction is a non distributed transaction;
   reading persistent data from said database storage unit and performing a plurality of operations with said persistent data to execute said non distributed transaction; and
   executing an emulated two-phase commit protocol comprising:
      sending a prepare command from a resource manager to said database storage unit to prepare for changes to be made to said persistent data as a result of the plurality of operations;
      sending a commit command from said resource manager to said database storage unit prior to reception of a ready command sent from said database storage unit in response to said prepare command to cause said database storage unit to commit said changes to said database storage unit; and
      updating said persistent data of said database storage unit with said changes only once in response to sending said prepare and said commit commands only after all of the plurality of operations with said persistent data are complete.

2. The method of claim 1 further comprising committing said changes to said database storage unit by overwriting said persistent data read from said database storage unit with said changes.

3. The method of claim 2 wherein sending the commit command further causes said database storage unit to commit an additional confirmed change to said database storage unit's persistent data, said additional confirmed change being a new listing for persistent data that did not exist in said database storage unit when reading the persistent data and performing operations with said persistent data.

4. The method of claim 1 wherein said resource manager comprises a Java Database Connectivity (JDBC) driver.

5. The method of claim 1 wherein said resource manager comprises an Open Database Connectivity (ODBC) driver.

6. The method of claim 1 further comprising caching in a cache said persistent data read from said database storage unit.

7. The method of claim 6 further comprises transferring information corresponding to said changes from said cache by said resource manager to said database storage unit.

8. The method of claim 1 wherein a transaction context module causes said prepare command and said commit command to be sent.

9. The method of claim 8 wherein said transaction context module is a transaction context object and said method is performed within an object oriented environment.

10. The method of claim 9 wherein said transaction context object identifies an object to be sent to said database storage unit to implement said changes in said database storage unit.

11. The method of claim 9 wherein the transaction context object includes a data field for detecting the non distributed transaction.

12. The method of claim 11 wherein said data field is a null parameter value.

13. The method of claim 11 further comprising creating a transaction context in response to said detecting.

14. An article of manufacture including program code which, when executed by a machine, causes the machine to execute a non distributed transaction that involves a single database storage unit by:
   detecting that a transaction is a non distributed transaction;
   reading persistent data from said database storage unit and performing a plurality of operations with said persistent data; and
   executing an emulated two-phase commit protocol comprising:
      sending a prepare command from a resource manager to said database storage unit to prepare for changes to be made to said persistent data as a result of the plurality of operations;
      sending a commit command from said resource manager to said database storage unit prior to reception of a ready command sent from said database storage unit in response to said prepare command to cause said database storage unit to commit said changes to said database storage unit; and
      updating said persistent data of said database storage unit with said changes only once in response to sending said prepare and said commit commands only after all of the plurality of operations with said persistent data are complete.

15. The article of manufacture of claim 14 wherein said resource manager comprises a Java Database Connectivity (JDBC) driver.

16. The article of manufacture of claim 14 wherein said resource manager comprises an Open Database Connectivity (ODBC) driver.

17. The article of manufacture of claim 14 further comprising caching in a cache said persistent data read from said database storage unit.

18. The article of manufacture of claim 17 further comprises transferring information corresponding to said changes from said cache by said resource manager to said database storage unit.

19. The article of manufacture of claim 14 wherein a transaction context module causes said prepare command and said commit command to be sent.

20. The article of manufacture of claim 19 wherein said transaction context module is a transaction context object and said method is performed within an object oriented environment.

21. The article of manufacture of claim 20 wherein said transaction context object identifies an object to be sent to said database storage unit to implement said change in said database.

22. The article of manufacture of claim 19 wherein the transaction context object includes a data field for detecting the non distributed transaction.

23. The article of manufacture of claim 22 wherein said data field is a null parameter value.

24. The article of manufacture of claim 22 further comprising creating a transaction context in response to said detecting.

25. A computing system comprising:
 a storage unit with persistent data;
 a resource manager configured to execute an emulated two-phase commit protocol comprising:
  sending a prepare command to the storage unit to prepare for changes to be made to the persistent data;
  sending a commit command to the storage unit prior to reception of a ready command sent from the storage unit in response to said prepare command to cause the storage unit to commit the changes;
  updating the storage unit only once with all the changes together; and
 a transaction context module to cause the prepare command and the send command to be sent to the storage unit once the non distributed transaction is complete, the transaction context module to detect that a transaction is a non distributed transaction.

26. The computing system of claim 25 wherein said resource manager comprises a Java Database Connectivity (JDBC) driver.

27. The computing system of claim 25 wherein said resource manager comprises an Open Database Connectivity (ODBC) driver.

28. The computing system of claim 25 further comprising a cache to store said persistent data read from said storage unit.

29. The computing system of claim 28 further comprising transferring information corresponding to said changes from said cache by said resource manager toward said storage unit.

30. The computing system of claim 25 wherein said transaction module is a transaction context object, said system performed within an object oriented environment.

31. The computing system of claim 30 wherein said transaction context object identifies an object to be sent to said storage unit to implement said changes in said storage unit.

32. The computing system of claim 30 wherein the transaction context object includes a data field for detecting the non distributed transaction.

33. The computing system of claim 32 wherein said data field is a null parameter value.

* * * * *